Nov. 3, 1970 W. R. FURNISS ET AL 3,537,792
TRANSPARENCY PROJECTION SYSTEM
Filed March 28, 1969 4 Sheets-Sheet 2
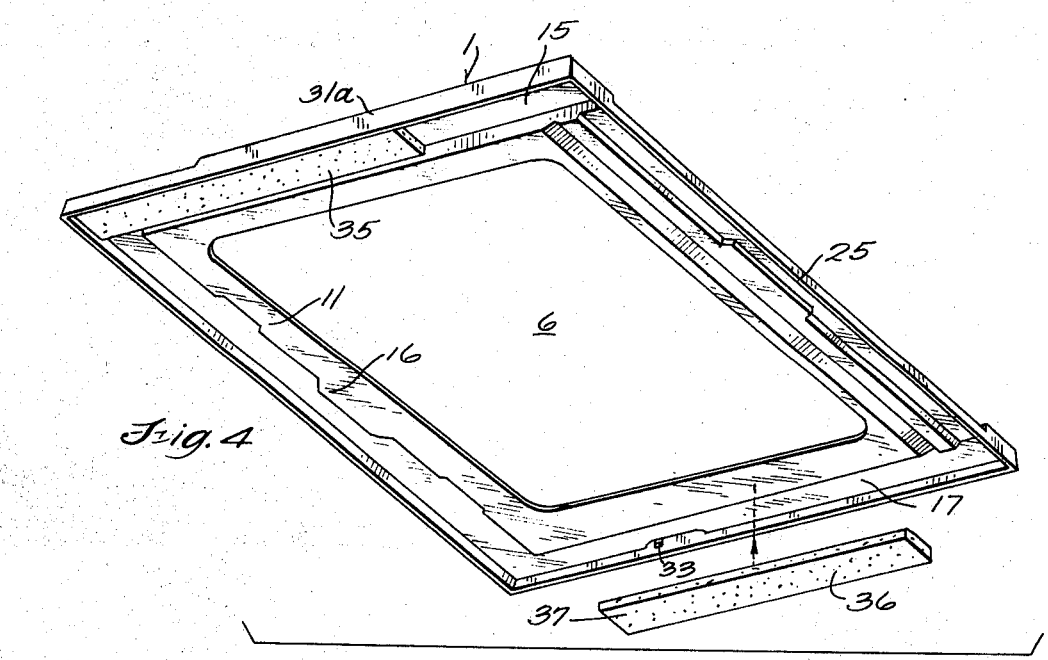
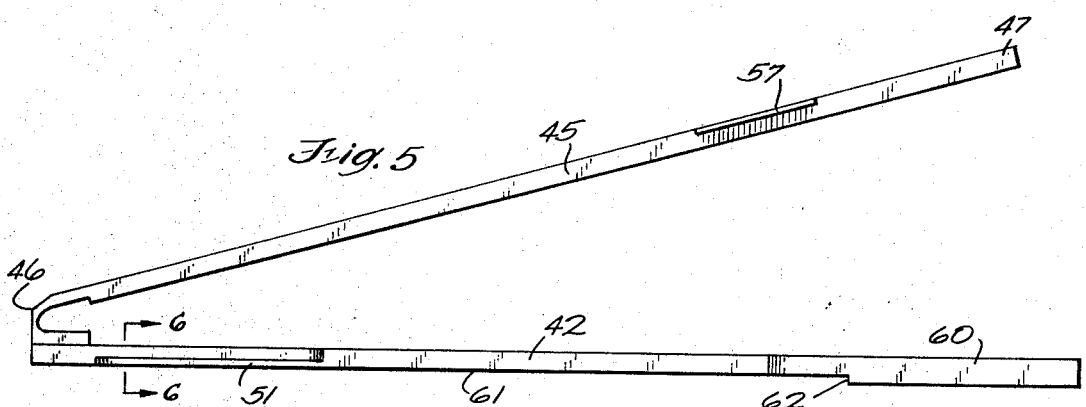
INVENTORS
WILLIAM R. FURNISS
RICHARD J. WEIR
BY
ATTORNEY

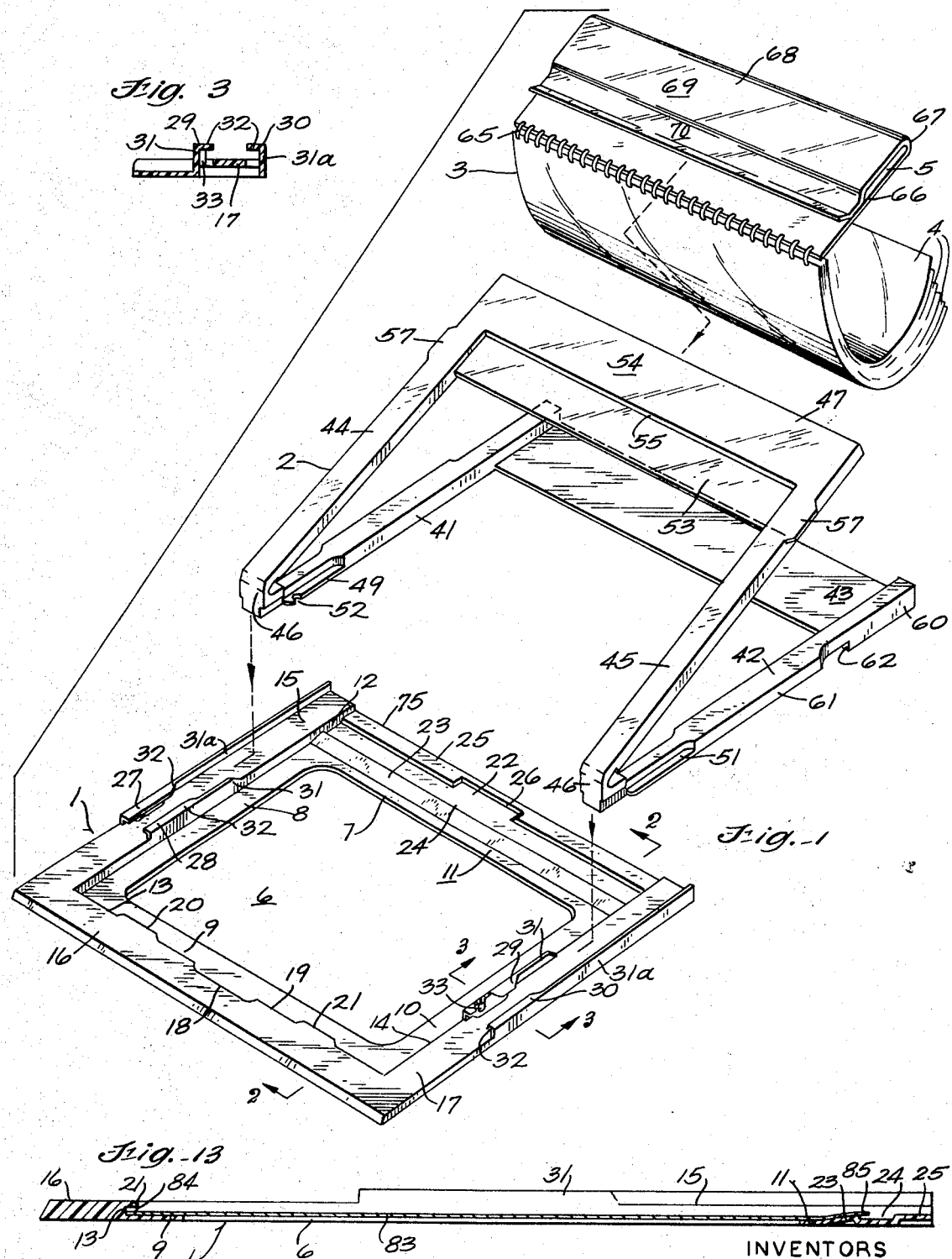

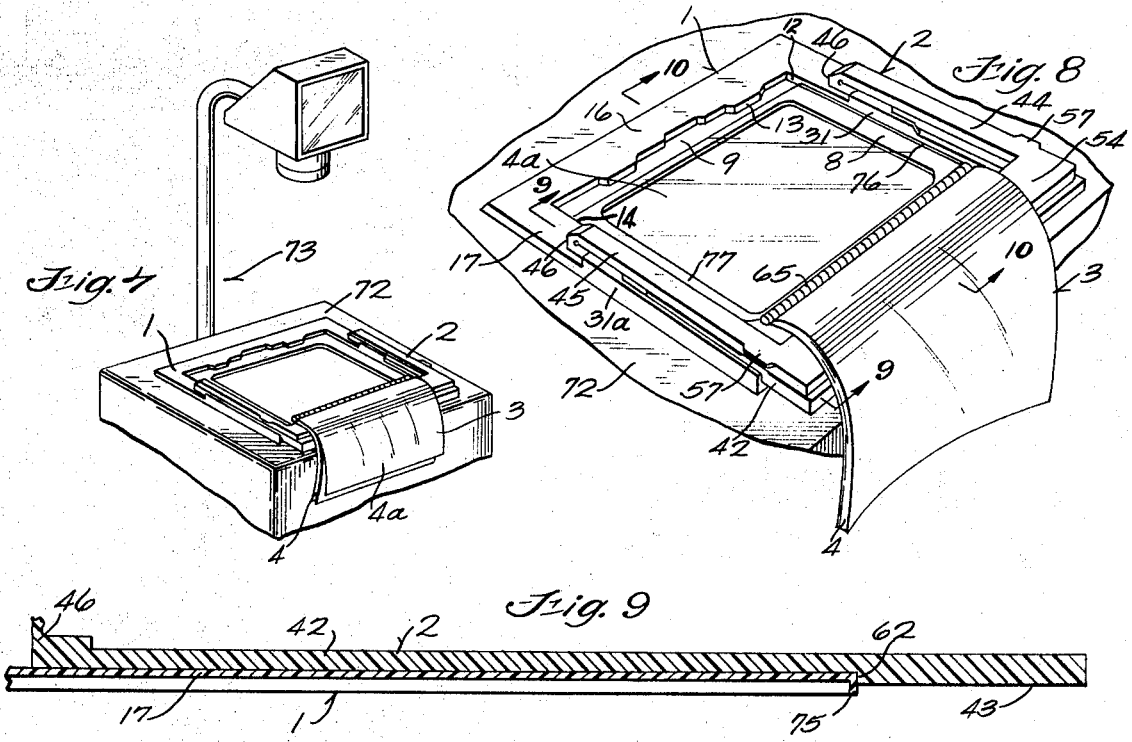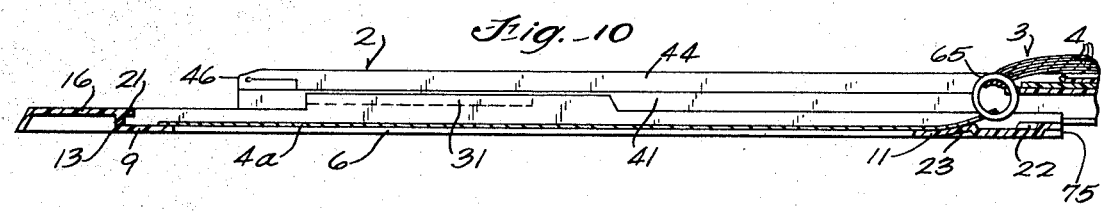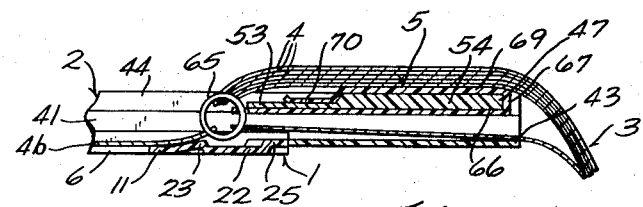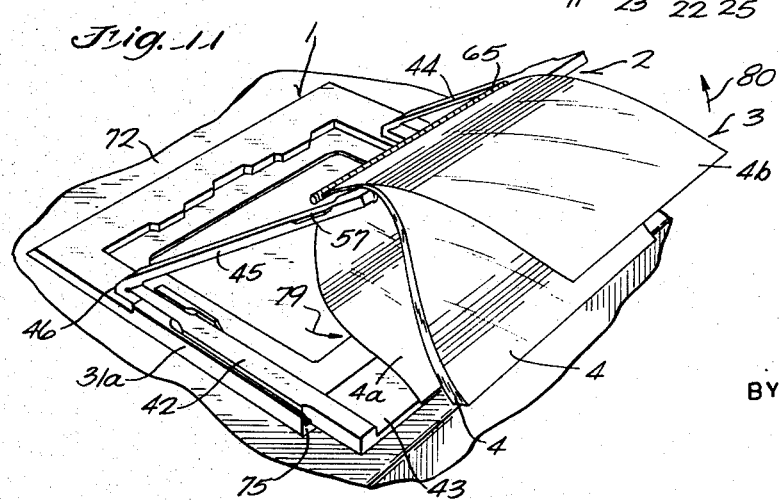
INVENTOR
WILLIAM R. FURNISS
RICHARD J. WEIR
BY
ATTORNEY Nov. 3, 1970
W. R. FURNISS ET AL
3,537,792
TRANSPARENCY PROJECTION SYSTEM
Filed March 28, 1969
4 Sheets-Sheet 4
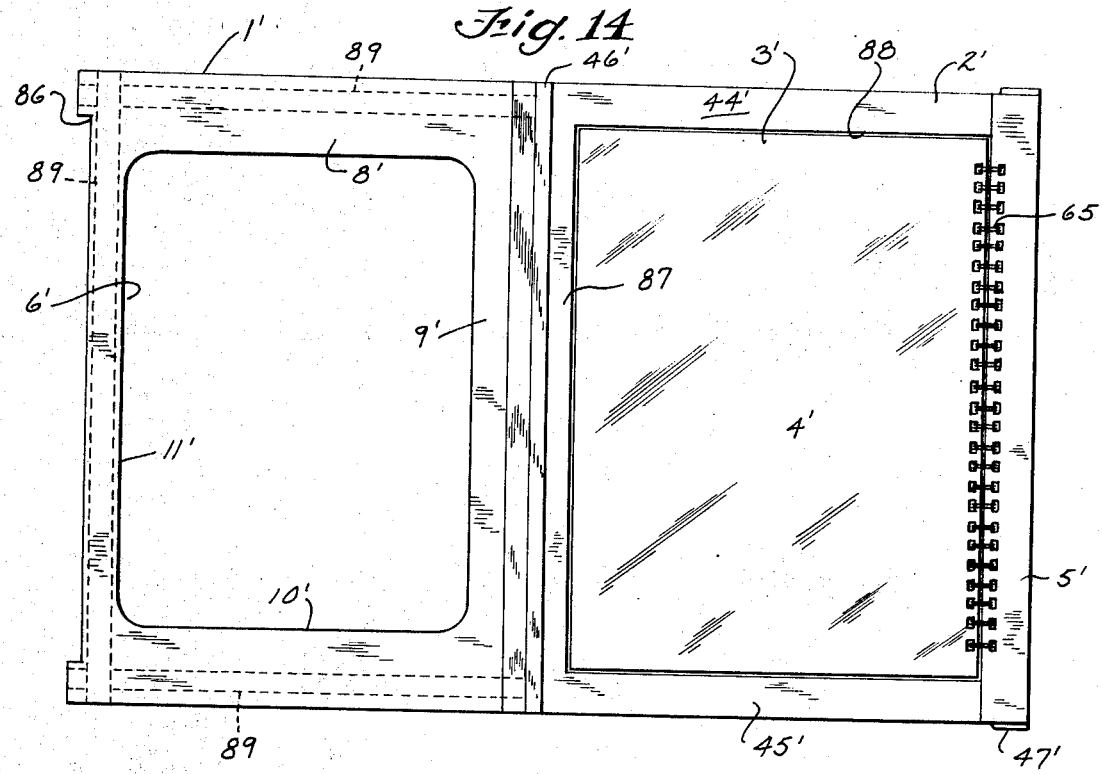
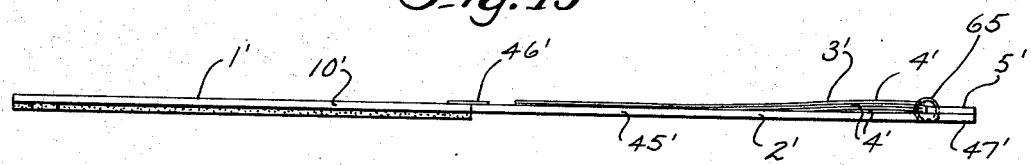
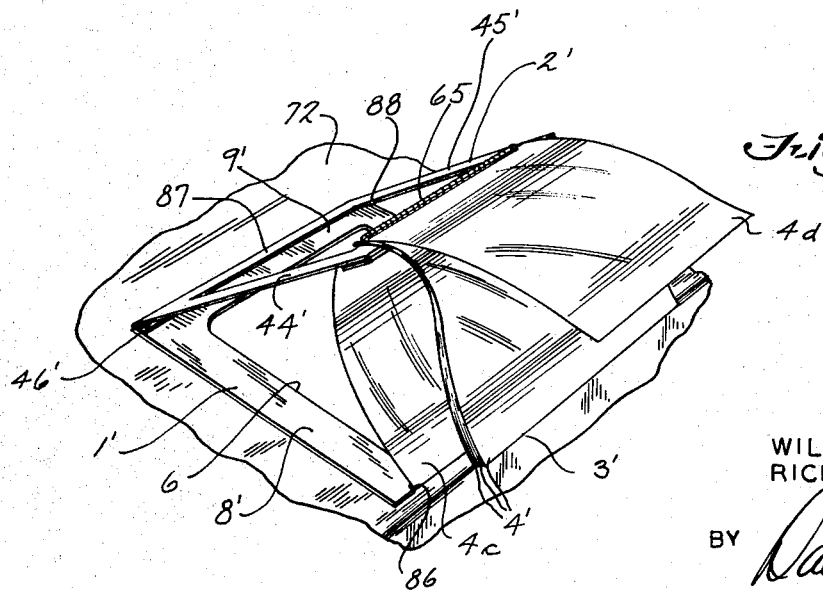
INVENTORS
WILLIAM R. FURNISS
RICHARD J. WEIR
BY
ATTORNEY United States Patent Office 3,537,792
Patented Nov. 3, 1970

3,537,792
TRANSPARENCY PROJECTION SYSTEM
William R. Furniss and Richard J. Weir, Milwaukee, Wis., assignors to Milprint, Inc., Milwaukee, Wis., a corporation of Delaware
Continuation-in-part of application Ser. No. 685,771, Nov. 27, 1967. This application Mar. 28, 1969, Ser. No. 814,886
Int. Cl. G03b 21/00
U.S. Cl. 353—120
14 Claims

ABSTRACT OF THE DISCLOSURE

Apparatus for arranging and manipulating transparencies on the stage of a projector including a base member which rests on the projector stage, a second member hingedly connected to the base member, and a bound set of transparencies connected to the second member so that the transparencies can be moved from a storage or at rest position to a projection position in which one or several of the transparencies can be projected. A particular form of base member suitable for use in projecting a single transparency as well as a bound group of transparencies is also shown.

CROSS-REFERENCE TO RELATED APPLICATION

This application is a continuation-in-part of our copending application Ser. No. 685,771 filed on Nov. 27, 1967.

BACKGROUND OF THE INVENTION

Field of the invention

The present invention relates to a system or apparatus for use in projecting a group of transparencies bound together similar to the usual book-form which will enable the bound transparencies to be projected either one at a time or in combinations such as may be desired for the sequential presentation of information.

The term transparency used herein refers to a sheet of transparent material, such as clear cellulose acetate film, carrying graphic material including pictorial or written information, most generally applied by printing. Transparencies of this type are often displayed to an audience with an overhead projector.

Prior art

Several systems for the projection of a group of transparencies other than handling each transparency individually are known in the prior art. One involves the use of a frame with a vertical post near one corner of the opening and a group of transparencies each having a hole in one corner. The post extends through the hole in each transparency and each transparency can be pivoted around the post so that it can be brought over the opening in the frame for projection. Another similar system involves the use of a ring about which transparencies are pivoted around one of their corners into and out of the projection area. In another known construction, a group of transparencies are bound along one side of the opening in a frame so that the transparencies and the frame become a single integral unit. Another prior art system for projecting a group of bound transparencies is shown in U.S. Pat. 3,253,358 and consists generally of a book having two covers hinged together with the free edge of one cover connected alongside the stage of a projector and with transparencies bound along the free edge of the other cover. In this latter system, changing the transparencies being projected involves relative hinged action between the two covers to move the group of transparencies away from the side of the projector stage to which the free edge of one cover is connected.

SUMMARY OF THE INVENTION

The present invention provides a new mode for the projection or display of a group of transparencies bound together incorporating a tray-like base member which is to be rested on the stage of a projector and has an opening through which transparencies can be projected, a second or yoke member to be hingedly connected to the frame near one side of the opening in the tray member and having a second portion along the opposite side of the opening, and a group of bound transparencies adapted to be connected to the second member along the said second portion thereof. The apparatus of this invention enables projection of the bound transparencies one at a time or in groups of two or more simultaneously.

DESCRIPTION OF THE DRAWINGS

FIG. 1 is an exploded view in perspective of a presently preferred embodiment of this invention;
FIG. 2 is a sectional view of the base element shown in FIG. 1 along the plane of line 2—2;
FIG. 3 is a sectional view through one of the sides of the base element along the plane of line 3—3 in FIG. 1;
FIG. 4 is a perspective view of the underside of the base elements;
FIG. 5 is a side view of the hinged yoke element shown in FIG. 1;
FIG. 6 is a sectional view along the plane of line 6—6 in FIG. 5;
FIG. 7 is a perspective view showing the transparency projection apparatus of this invention arranged on the stage of an overhead projector;
FIG. 8 is a perspective view showing a transparency in position for projection;
FIG. 9 is a fragmentary sectional view showing the arrangement between the hinged yoke member and base element when combined as shown in FIG. 7;
FIG. 10 is a sectional view with a transparency in position for projection;
FIG. 11 is a perspective view illustrating an intermediate stage in the act of changing from one transparency to another;
FIG. 12 is a sectional view showing the relative positioning of transparencies stored prior to projection, a transparency being projected, and the position of transparencies after projection;
FIG. 13 is a sectional view similar to FIG. 2 showing the base element of FIG. 1 used for projecting a single transparency;
FIG. 14 is a top view of another embodiment of this invention;
FIG. 15 is an end view of the embodiment of FIG. 14; and
FIG. 16 is a perspective view illustrating an intermediate stage in the act of changing transparencies with the embodiment of FIG. 14.

DESCRIPTION OF PREFERRED EMBODIMENTS

(A) FIGS. 1–12

FIG. 1 illustrates the three basic elements of the first embodiment of this invention herein described. The apparatus includes a base member 1, a yoke 2 adapted for attachment to the base member, and a bound assembly 3 of the transparencies comprising a plurality of transparency sheets 4 bound to a clip 5. The specific construction of each of these elements will be described in detail before the operation of the entire assembly is explained.

(a) Construction of base member 1

The base member 1 has a central opening 6 surrounded on its four sides by a lower shelf or wall indicated generally by the reference numeral 7 and comprising four lower walls 8, 9, 10 and 11 on each side of the opening. Vertical walls 12, 13 and 14 surround the lower wall 7 on three of its sides and the sides 15, 16 and 17 of the base member have their top surfaces spaced above the lower wall 7. This construction forms a well or depression in the base member for the purposes hereinafter explained. The side 16 is constructed to have a central notched-out portion 18 which is cut away from the upper edge 19 of the vertical wall 13 and two spaced projecting ears 20 and 21 which extend towards the opening 6 from the vertical wall 13. As best shown in FIG. 2, the ears 20 and 21 extend over the lower wall 9 but are spaced therefrom by the vertical wall 13.

Referring now to FIGS. 1 and 2 the side 22 of the base member along the fourth side of the opening 10 has a slanted wall 23 which slopes upwardly and away from the lower wall 11 along the side 22, a groove 24, and a raised portion 25 on the opposite side of the groove 24 from the slanted wall 23. The groove 24 is formed to have a central notch 26 as shown in FIG. 1.

The sides 15 and 17 of the base member 1 each have a pair of spaced L-shaped guides 27, 28, 29 and 30 respectively arranged so that the guides 27 and 28 form a slideway on the side 15 and guides 29 and 30 form a similar slideway on the side 17. FIGS. 3 shows the structure of L-shaped guide 29 as having vertical wall 31 extending upwardly from the top surface of its respective side 17, guide 30 has a vertical wall 31a extending upwardly therefrom, and a horizontal wall 32 extending from the top of each vertical wall 31 and 31a to overlie part of the top surface of side 17. Guides 27 and 28 have the same structure as guides 29 and 30 respectively. A projection 33 is formed between the vertical wall 31 of each L-shaped guide 28 and 29 (see FIG. 1) to form one portion of a locking means for co-action with a mating portion formed on the arms of the hinged yoke 2 as will be more fully described below. The vertical wall 31a of guides 27 and 30 are longer than the vertical wall 31 of guides 28 and 29 and preferably extend to the ends of sides 15 and 17 as shown in the drawings for the reason hereinafter explained.

In FIG. 4, the underside of the base member 1 is exposed and in the particular construction illustration, each side 15 and 17 is formed to have a recessed portion and weights 35 and 36 are attached to the base member within such recessed portions of the sides 15 and 17 respectively. The weight 35 is shown in its final position while the weight 36 is shown in the process of being inserted. The weights may be attached to the base member by any suitable means, such as adhesive or mechanical fasteners, and it is useful for each weight to have a non-skid or high friction coating 37 on its bottom as indicated by the stippling in the drawing. Weights also may be attached under sides 16 and 25 of the base member either in addition to or in lieu of the weights under sides 15 and 17.

The construction of the base member as described above lends itself to being formed of molded synthetic plastic as a single integral unit. Materials such as polypropylene, polyethylene, styrene, etc. are suitable, although it may be made of non-plastic material such as wood or metal in an appropriate instance if so desired.

(b) Construction of yoke 2

Returning to FIG. 1, the yoke 2 includes a pair of spaced lower arms 41 and 42 connected across one of their ends by a lower cross-member 43, and a pair of spaced upper arms 44 and 45 hinged to the lower arms 41 and 42 respectively along hinge means 46. The opposite ends of the upper arms 44 and 45 are connected by upper cross-member 47. Each lower arm 41 and 42 is formed to have tracks 48, 49, 50 and 51 at its end near the hinge means 46, and tracks 49 and 50 include a notch or cut-out portion 52 (the notch 52 in track 50 is not visible in FIG. 1, but can be seen in FIG. 6). When it is desired to assemble the yoke 2 to the base member 1, the tracks 48–51 are inserted between the L-shaped guides 27–30 on the base member 1 and the notches 52 of tracks 49 and 50 engage the projections 33 of the guides 28 and 29 to lock the yoke and base member together. Vertical walls 31a of guides 27 and 32 are elongated as described above to minimize or eliminate angular positioning between the yoke and base member when they are assembled in such fashion, thereby reducing the danger of breakage where the yoke or base (or both) may be made of plastic material.

The hinge means 46 connecting the upper end lower arms of the yoke 2 is shown herein as an integrally molded portion of the yoke. This may be satisfactorily accomplished, for example, by molding the yoke as a single piece of polypropylene plastic; other hinge means constructions can be utilized, including separate hinges attached between the yoke and the base.

The upper cross-member 47 is shaped as shown in FIG. 1 to have a stepped configuration including a lower wall 53 and an upper wall 54 connected by a vertical wall 55. Referring now to FIG. 5 each lower arm 41 and 42 has an end portion 60 opposite from the hinge means 46 that extends below the bottom 61 of the rest of the lower arm to form a ledge 62 extending across the lower cross-member 43, for the purpose described below.

(c) Construction of bound assembly 3 of transparencies

The construction of a bound assembly 3 of transparencies as shown in detail in FIG. 1 includes a plurality of transparency sheets 4 bound to a clip means 5 with, in the described embodiment, a wound wire binding 65. The binding 65 permits each transparency 4 to be hinged or folded about the wire relative to the clip 5. Other types of binding means can be utilized such as rings, hinges, removable pin hinge units, plastic binding strips, posts, etc. The clip 5 is to be attached to the upper cross-member 47 of the yoke 2 and for this purpose is shown as having a generally U-shaped structure including a lower arm 66 that is slightly longer than the width of the cross-member 47 so that the binding 65 will be spaced just inwardly of the innermost edge of the cross-member 47 when the clip is joined to the cross-member. The lower arm 66 of the clip 5 is connected across the bright 67 to an upper arm 68 formed to have a flat portion 69 and tongue 70 formed as a grooved or channeled portion across the clip. The flat portion 69 of the upper arm is of the same width as the upper wall 54 of the cross-member 47 and is spaced from the lower arm 66 of the clip a distance equal to the thickness of the cross-member 47. The bottom-most edge of the tongue 70 contacts or nearly contacts the lower arm 66. With this construction, using a clip 5 made, for example, of spring steel, flexible plastic, or other resilient or spring-like material, the lower arm 66 of the clip is adapted to fit underneath the lower wall 53 and upper wall 54 of the cross-member 47 while the upper arm 68 fits over the said walls with the flat portion of the upper arm engaging the top surface of the upper wall 54 of the cross-member 47 and the tongue 70 engaging the lower wall 53 of the cross-member 47 in order to hold the bound assembly 3 of transparencies in a fixed position on the upper cross-member of the yoke 2. This attachment of the clip 5 to the yoke is best shown in FIG. 12.

The transparencies 4 may carry and desired information, such as educational matter or advertising material, pictorial and/or written, and are usually made by printing on sheets of clear material such as cellulose acetate film. Each transparency 4 may carry information that is independent of that on the others or they mary be related to one another to present the development of a selected base subject matter with a set of transparencies.

(B) OPERATION

FIG. 7 illustrates the assembled apparatus as shown in the preceding drawings attached to the stage 72 of an overhead projector indicated generally by the reference numeral 73. The base member 1 is first applied over the glass stage of the projector with its central opening 6 acting as the framed portion through which the transparencies will be projected. The weights 35 and 36 attached to the base member aid in holding it in a stable, fixed position on the projector and the non-skid coating 37 on the bottom of the weights further help to maintain the desired position. The yoke 2 is connected to the base member 1 by sliding the lower arms 41 and 42 of the yoke along the sides 15 and 17, respectively, of the base member until the tracks 48–51 of the yoke fit into the L-shaped guides 27–30 of the base and the notches 52 formed in the tracks 49 and 50 engage the projections 33 formed in the guides 28 and 29 to thereby attach the yoke to the base. Next, the bound assembly 3 of transparencies is attached to the upper cross-member 47 of the yoke 2 in the manner previously described wherein the tongue 70 of the clip 5 engages the lower wall 53 of the cross-member 47 to hold the clip on the cross-member.

The arrangement of the three elements of the apparatus is shown in detail in FIG. 8 and it can be seen that when in this assembled condition the yoke 2 is hingedly connected to the base along one side of the opening 6 in the base member while the transparencies 4 are hingedly connected to the yoke along an opposite side of the opening 6.

The detailed view of FIG. 9 shows the purpose of the ledge 62 extending across the bottom of the lower cross-member 43 of the yoke. With the base member 1 arranged on the projector stage, and the yoke 2 connected to it, the ledge 62 across the lower cross-member 43 of the yoke engages an end 75 of the base element 1 which, referring back to FIG. 1, is the rear wall of the side 22 of the base member. This provides a means for attaching the yoke to the base in a registered or fixed location relative to the base member.

In the initial condition of FIG. 7, all the transparencies 4 are shown in a ready or storage position in which none of them is arranged over the stage of the projector. In order to project the uppermost transparency 4a, it is hinged around the wire binding 65 until it is in the position shown in FIG. 8 wherein it overlies the stage 72 of the projector. The vertical walls 12, 13 and 14 and slant wall 23 of the respective sides of the base in conjunction with the lower wall 7 in effect form a well surrounding the central opening 6 of the base and the transparencies have at least two of their sides engaging wall portions of the well in order to obtain registration. In the condition illustrated, the transparency 4a has its sides 76 and 77 in contact with the adjacent vertical walls 12 and 14 of the sides 15 and 17 respectively of the base element. This, in combination with the fixed position of the wire binding 65, provides accurate registration of the transparency relative to the projector stage. Further, proper registration of one transparency with respect to another is also possible for the situation where two or more transparencies are arranged on top of each other over the stage to be projected simultaneously. Accurate registration of a transparency vis-a-vis the stage of a projector is vital to many uses of transparencies, and the present invention allows this to be obtained with a bound group of transparencies. FIG. 10 shows a detailed view of the assembly in this condition with transparency 4a in position for projection and the rest of the transparencies in the storage position wherein they are arranged over the ends of the yoke and base.

The process of changing the transparency being projected is illustrated best in FIG. 11. In order to accomplish this, the upper arms 44 and 45 of the yoke 2 are moved about the hinge means 46 and rotated upwardly as shown by the arrow 78. Handles 57 are provided on arms 44 and 45 to aid the user in grasping the arms for such movement. The transparency 4a is then moved about the binding means 65 in the direction of arrow 79 to the position wherein it lies between the upper cross-member 47 of the yoke and the lower cross-member 43, or the side 22 of the base. The notch 18 formed in side 16 of the base member allows the user a convenient position at which to grasp an edge of the transparency and move it out of the projection area. The upper arms 44 and 45 are then hinged downwardly about the hinge means 46 until they contact the lower arms 41 and 42, and the transparency to be projected, transparency 4b in FIG. 11, is then hinged about the wire binding means 65 in the direction of arrow 80 until it is in the desired position over the stage 72 of the projector. The final condition is shown in the view of FIG. 12 which shows the transparency 4a disposed between the upper cross-member 47 and lower cross-member 43 of the yoke 2 after it is removed from the stage, the transparency 4b to be projected is in position over the opening 6 of the base member 1, and the transparencies which have not yet been projected, transparencies 4, remain in their original position wherein they hang over the uppermost face of the upper cross-member 47 of the yoke.

Transparencies are manipulated as described above until all or a selected part of the transparencies 4 have been projected. The assembly 3 of the transparencies can then be removed and another assembly with different transparencies attached to the yoke if more are to be projected. Changing from one set of transparencies is accomplished rapidly with the present invention.

(C) FIG. 13

The base member 1 as previously described may also be utilized for the projection of single transparencies. When so used, the yoke is detached from the base member by disengaging the tracks 49–51 of the yoke member from their locked engagement with the L-shaped guides 27–30 on the sides of the base member 1. A single transparency can then be inserted over the opening 6 of the base member with its marginal edges resting on the circumferential or perimeter wall 7 surrounding the opening 6. Proper registry of the transparency can be obtained by having one end of the transparency abut the vertical wall 13 of the side 16 of the base element and the opposite sides of the transparency contact the vertical walls 12 and 14 of the base member. A cross sectional view of a single transparency 83 in such condition is illustrated in FIG. 13. Also, the purpose of the sloping wall 23 of the side 22 of the base member is therein illustrated. The marginal edge portion 84 of the transparency 85 is shown abutting the vertical wall 13 of the side 16 of the base member. With the dimension of the transparency 83 properly chosen, the opposite marginal edge 85 of the transparency will project slightly beyond the end of the sloping wall 23 of the side 22 of the base member and be positioned above the groove 24 formed therein. This projecting marginal portion 85 is then in a position wherein it is easily accessible to user so that when it is desired to remove the transparency 83 from the base member, a user may readily grasp the marginal portion 85 with his fingers. Thus the provision of a yoke member which may be detachably secured to a base member as in the illustrated embodiment of this invention allows a single system to be used for the projection of both single and bound transparencies, and the specific base member shown herein further facilitates this dual function.

The ears 20 and 21 of the side 16 extend over the transparency 83 to aid in preventing its accidental removal from the well in the base member.

(D) FIGS. 14–16

The second form of this invention as illustrated in FIGS. 14–16 includes a base member 1', a yoke 2' hinged to the base, and a bound assembly 3' of transparencies which are hingedly attached to the yoke. This embodiment is particularly adapted as a self-contained unit in which the several elements are permanently combined to form a complete system once they have been assembled, or the elements can be formed from a single piece of material suitably processed to define the individual elements.

The base member 1' includes a central opening 6' surrounded by walls 8', 9', 10', and 11'. The wall 11' may also include a notch or a cut-out portion 86 for the purpose discussed below. As indicated in FIGS. 14 and 15, the underside of the base member 1' includes pads 89 arranged on the walls 8', 10' and 11' as an aid to securing the base member in place on the stage of an overhead projector. The pads 89 may be of a foam material to reduce slippage and can also include weights as a further adjunct to holding the base member in the desired position. The tray-like base member 1 also can be utilibed with this embodiment.

The yoke 2' includes a first arm 44' and a second arm 45' connected across one of their ends by a first cross-member 47'. The arms 44' and 45' may also be connected across their opposite ends by second-cross member 87. The yoke 2' can be most conveniently made from a single sheet of suitable material in which a central opening 88 is cut to define the two arms 44', 45' and cross-members 47', 87.

The bound assembly 3' of transparencies includes a plurality of transparency sheets 4' joined to a clip member 5' with wound wire binding 65. The clip member 5' is attached to the cross-member 47' of the yoke. The clip means 5' can also be formed as an extension panel hinged to the cross-member 47' and wherein it lies alongside the cross-member for attachment of the transparencies with the wire binding and is thereafter folded to overlie and become attached to the cross-member. The clip member 5' can be permanently attached to the yoke if a permanently-bound system is desired such as by adhesive, mechanical fasteners, etc., or it can be detachably attached to the cross-member as by a clip of the type shown with the first embodiment to allow for interchangeability of the transparencies. In any event, the transparencies are hingedly connected to the cross-member 47' of the yoke as with the first embodiment.

The yoke 2' is hingedly connected to the base member 1' by hinge means 46', which may comprise a separate element as shown in the drawings or can be an integral hinge if the apparatus is formed of molded plastic or scored material. The hinge means 46' is shown as connecting ends of the first and second arms 44' and 45' to the base member and also as connecting the second cross-member 87 to the base member, thereby allowing hinged movement of the yoke relative to the base member. The notch 86 formed in the wall 11' of the base member 1' is intended to receive the wire binding 65 attaching the transparencies to the yoke when the yoke is folded over the base member for projection of one or more transparencies to enable the yoke to be arranged in a substatnially flat condition when positioned over the base.

The operation of the second embodiment of this invention is the same as that of the first and is illustrated by FIG. 16. The base element 1' is placed on the stage 72 of an overhead projector with its central opening 6' forming the framed portion through which transparencies will be projected. The yoke 2' is hingedly connected to the base along one side of the opening 6' and the transparencies 4' are hingedly connected to the yoke along the opposite side of the opening. One or more transparencies 4' are moved into projecting position where they rest against the base element 1' over the opening 6', the yoke 2' being moved about the hinge means 46' to accomplish this positioning. The opening 6' is smaller than the transparencies so that a transparency will rest on walls of the base member when being projected. FIG. 16 shows an intermediate position in which the yoke 2' has been hinged upwardly with respect to the base element 1' so that transparency 4c can be transferred to a storage position and transparency 4d can be moved into projecting position. The yoke lies flat against the base element when transparencies are being projected. Ttransparencies which have been projected are stored between the cross-member 43' of the yoke and the base member.

CONCLUSION

There has thus been described a new system or apparatus for projecting transparencies which has a number of advantages over prior art devices. In the first embodiment herein described, excellent registration of the transparencies relative to the opening in the base member is obtained through the provision of vertical walls which contact edges of a transparency in position for projection, and through the provision of the means connetcing the transparencies to the clip, which means are shown in the form of wire binding. Thus the transparency is registered with respect to three of its sides.

Further, the provision of a base member which has a well-like tray shape and includes registration means enables single transparencies to be shown together with or be interchangeable with the bound transparencies connected to the loke member of the combination, and the individual transparencies can be properly registered relative to the bound transparencies. This feature also enables the same system to be used for the projection of single transparencies when the yoke is detached from the base member. Additionally, in the first form shown, the life of the unit is not dependent upon a paperboard cover which is constantly hinged to change transparencies as is the case with some prior art devices; instead, relatively strong and long-lived hinge means can be provided for connecting the arms of the yoke to the base member. The use of weights in the base member to hold it on the stage of a projector eliminates the need for clips and similar devices, or auxiliary stages, that sometimes must be attached to the stage of a projector in order to hold prior art devices in the desired position.

In the projection apparatus of this invention, the bound group of transparencies is attached to the upper cross member of the yoke along one side of the opening in the base element and the hinge means connecting the yoke to the base element are located along an opposite side of the opening. As illustrated in the drawings, when transparencies are changed, the yoke is hinged upwardly and over the opening in the base element, which movement will also be over the stage of the projector. This is in contrast to some prior art systems, see for example that in U.S. Pat. 3,253,358, wherein the bound group of transparencies must be moved away from the projector stage when it is is desired to change the transparencies; during such change, there is a relatively substantial bending moment or force exerted by the weight of the transparencies which can upset the positioning of the apparatus on the projector stage. However, with this invention there is much less danger of moving the apparatus out of its desired position relative to the projector stage since there is a minimal bending moment developed by the weight of the transparencies as they are moved through their various positions during operation of the device. In any transparency projection apparatus, it is of course vital that it be easy to manipulate the transparencies without undue movement of the apparatus on the stage itself and these benefits are obtained with the system of this invention to a greater degree than many prior art systems. The second embodiment also has this advantage although it represents a simplified version of the first embodiment with respect to the base and yoke constructions.

Although two presently-preferred embodiments of this invention have been described in sufficient detail to enable practice of this invention, it should be pointed out that it is expected that various changes and modifications can be made to the described embodiments and still remain within the concept of this invention. For example, the yoke is shown as having upper arms connected to lower arms which in turn are attached to the base element; the lower arms can be eliminated and the upper arms connected directly to the base element with suitable hinge means. This disclosure will suggest other change to those skilled in the art. It is to be understood that it is intended to cover all changes and modifications of the examples of this invention herein disclosed, as well as other embodiments not disclosed, which do not constitute a departure from the true spirit and scope of this invention.

We claim:

1. Apparatus for projecting transparencies on the stage of a projector, comprising:
   (1) a base member having an opening;
   (2) a yoke hingedly attached to the base member and including
      (a) a first arm along one side of the opening in the base member and a second arm along an opposite side thereof,
      (b) a cross-member connecting each arm along a third side of the opening,
      (c) hinge means hingedly connecting the first and second arms to the base member along the ends thereof opposite from the cross-member;
   (3) a bound assembly of transparencies including
      (a) transparency connection means adapted for attachment to the cross-member of the yoke,
      (b) a plurality of transparencies,
      (c) means joining the transparencies to said transparency connection means for hinged movement of each transparency about the transparency connection means;
   each transparency being movable from a first position in which it overlies the cross-member of the yoke, to a second position in which it overlies the opening in the base member for projection, and to a third position in which it is arranged between the cross-member of the yoke and the base member upon movement of the first and second arms of the yoke about the hinge means connecting said arms to the base member to thereby raise the cross-member relative to the base member for passage of the transparency therebetween.

2. Apparatus according to claim 1 wherein:
the base member further includes a lower wall surrounding the opening therein and on which a transparency rests for projection, vertical walls on at least three sides of the lower wall, with at least two of the vertical walls arranged to abut edges of a transparency in position for projection to thereby register the transparency relative to the opening in the base member.

3. Apparatus according to claim 2 wherein:
the base member includes a sloping wall along a fourth side of the opening which slants upwardly and away from the opening, and a groove alongside the sloping wall at the edge thereof remote from the opening.

4. Apparatus according to claim 1 further including:
means for attaching the yoke to the base member and adapted to hold the yoke in a fixed position relative to the base member and further adapted for separation of the yoke from the base member.

5. Apparatus according to claim 4 wherein:
the yoke includes third and fourth arms arranged underneath the first and second arms respectively, and a lower cross-member connecting the third and fourth arms and arranged under the cross-member connecting the first and second arms,
the hinge means hingedly connect the first and second arms to the third and fourth arms respectively, and
the means for attaching the yoke to the base member includes first locking means on the base member and second locking means on the yoke, the first and second locking means adapted for engagement with each other to attach the yoke to the base member.

6. Apparatus according to claim 5 wherein:
the first locking means on the base member includes a quideway on each of two opposite sides of the base member,
the second locking means includes track means on the third and fourth arms of the yoke, and
the guideways and the track means are adapted for locking engagement with each other.

7. Apparatus according to claim 5 wherein:
the lower cross member of the yoke includes an end wall portion adapted to engage an end wall portion of the base member when the yoke is attached to the base member to thereby register the position of the yoke relative to the base member.

8. Apparatus according to claim 1 wherein:
the transparency connection means comprises a generally U-shaped clip means having spaced upper and lower arms, one of said arms being as wide as the width of the cross-member of the yoke, said arms being adapted to be arranged on opposite sides of the cross-member of the yoke with said one arm having an edge portion along the third side of the opening in the base member, and wherein the means joining the transparency to the transparency connection means are attached to said edge portion of said one arm of the transparency connection means.

9. Apparatus according to claim 1 wherein:
the base member includes recessed portions defined along its bottom, and weights are positioned in said recessed portions to aid in holding the base member on the stage of a projector.

10. A rectangular base member for projecting transparencies on the stage of a projector, comprising:
an upper wall extending around three sides of the base member, and a lower wall located inside the upper wall and extending around four sides of the base member to surround an opening defined therein;
vertical walls between the upper and lower walls on the three sides of the base member about which the upper wall extends; and
a sloping wall along a fourth side of the opening which slants upwardly and away from the opening, and a groove alongside the sloping wall at the edge thereof remote from the opening.

11. A base member according to claim 10 further including:
guideway means located on each of two opposite sides of the upper wall of the base member and adapted to receive arms of a yoke member, the glideway means on each arm including a pair of spaced L-shaped elements each comprising a vertical wall extending from the upper wall and a horizontal wall extending from the vertical wall towards the other element to overlie the upper wall of the base member.

12. A base member according to claim 11 wherein:
each pair of guideway elements includes locking means adapted to engage arms of a yoke member inserted therebetween.

13. Apparatus for projecting transparencies on the stage of a projector, comprising:
   (1) a base member having an opening;
   (2) a yoke hingedly attached to the base member and including
      (a) a first arm along one side of the opening in the base member and a second arm along an opposite side thereof,
      (b) a cross-member connecting each arm along a third side of the opening;
      (c) hinge means hingedly connecting the first and second arms to the base member along the ends thereof nearest a fourth side o fthe opening opposite from said third side; and (3) a plurality of transparencies attached to the cross-member of the yoke, said transparencies being adapted for hinged movement about said cross-member, each transparency being movable from a first position in which it overlies the cross-member of the yoke, to a second position in which it overlies the opening in the base member for projection, and to a third position in which it is arranged between the cross-member of the yoke and the base member upon movement of the first and second arms of the yoke about the hinge means connecting said arms to the base member to thereby raise the cross-member relative to the base member for passage of the transparency therebetween.

14. Apparatus according to claim 13 wherein:
the yoke includes a second cross-member connecting each arm along said fourth side of the opening in the base member, and the hinge means is arranged to also hingedly connect the second cross-member to the base member.

References Cited
UNITED STATES PATENTS

| | | | |
|---|---|---|---|
| 2,795,067 | 6/1957 | Walker | 40—106.1 |
| 3,176,580 | 4/1965 | Metz | 353—120 |
| 3,353,358 | 5/1966 | Wright | 40—106.1 |
| 3,269,261 | 8/1966 | Porter | 353—35 |

SAMUEL S. MATTHEWS, Primary Examiner